United States Patent
Okano

(10) Patent No.: US 6,763,238 B1
(45) Date of Patent: Jul. 13, 2004

(54) PORTABLE COMMUNICATION SYSTEM AND STORAGE MEDIUM STORING PROGRAM THEREFOR CAPABLE OF SEPARATELY CONTROLLING TRANSMISSION FUNCTION

(75) Inventor: Yoichi Okano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/358,576

(22) Filed: Jul. 21, 1999

(30) Foreign Application Priority Data

Jul. 23, 1998 (JP) .......................................... 10/208439

(51) Int. Cl.$^7$ ................................................ H04B 1/00
(52) U.S. Cl. .................. 455/456.4; 455/574; 455/343.4
(58) Field of Search ................. 455/556, 557, 455/574, 571, 344, 343, 566, 572, 343.4, 567, 417, 456.4, 69, 556.1, 556.2; 370/311

(56) References Cited

U.S. PATENT DOCUMENTS

| | | | | |
|---|---|---|---|---|
| 5,337,346 A | * | 8/1994 | Uchikura .................... | 455/556 |
| 5,797,089 A | * | 8/1998 | Nguyen ...................... | 455/403 |
| 5,819,170 A | | 10/1998 | Norimatsu | |
| 5,903,845 A | * | 5/1999 | Buhrmann et al. .... | 379/211.02 |
| 6,011,973 A | * | 1/2000 | Valentine et al. ........ | 455/456.6 |
| 6,208,852 B1 | * | 3/2001 | Konishi ................. | 379/215.01 |
| 6,246,891 B1 | * | 6/2001 | Isberg et al. ................ | 455/574 |
| 6,317,593 B1 | * | 11/2001 | Vossler ........................ | 455/414 |
| 6,438,385 B1 | * | 8/2002 | Heinonen et al. ........... | 455/501 |

FOREIGN PATENT DOCUMENTS

| | | |
|---|---|---|
| EP | 0 891 110 A1 | 1/1999 |
| GB | 2 266 211 A | 10/1993 |
| GB | 2 317 304 A | 3/1998 |
| GB | 2 320 164 A | 6/1998 |
| JP | S59-9661 | 1/1984 |
| JP | S62-43959 | 2/1987 |
| JP | H3-209575 | 9/1991 |
| JP | H7-123158 | 5/1995 |
| JP | H8-251097 | 9/1996 |
| JP | H9-200821 | 7/1997 |
| JP | H9-203561 | 8/1997 |
| JP | H9-331567 | 12/1997 |
| JP | H10-42362 | 2/1998 |
| JP | H10-135891 | 5/1998 |
| JP | H10-150406 | 6/1998 |
| JP | H10-154111 | 6/1998 |
| JP | H11-355957 | 12/1999 |

* cited by examiner

Primary Examiner—Nick Corsaro
(74) Attorney, Agent, or Firm—Scully, Scott, Murphy & Presser

(57) ABSTRACT

A portable communication system and a storage medium storing a program for the portable communication system which are capable of temporarily stopping transmissions from the portable communication system, while being capable of using other functions such as information processing function, etc. separately from the transmitting function. The portable communication system comprises a control circuit, a display section, a loudspeaker, a vibrator, a memory, a data input section, a receiving section, a transmitting section, a timer, an antenna, a power circuit, a switch, and a power-supply circuit. When the user inputs a transmission suspension command to the control circuit using the data input section, the timer is activated. The timer generates a power cut-off signal to turn off the switch. As a result, the power supplied to the transmitting section from the power circuit via the power-supply circuit is cut off, to cause the transmitting section to be at recess. Thus, malfunctions in other electronic equipment and apparatus can be prevented. Since the other functional parts are supplied with power even while the transmission function is suspended, the user can play games, etc. using an information processing function.

18 Claims, 9 Drawing Sheets

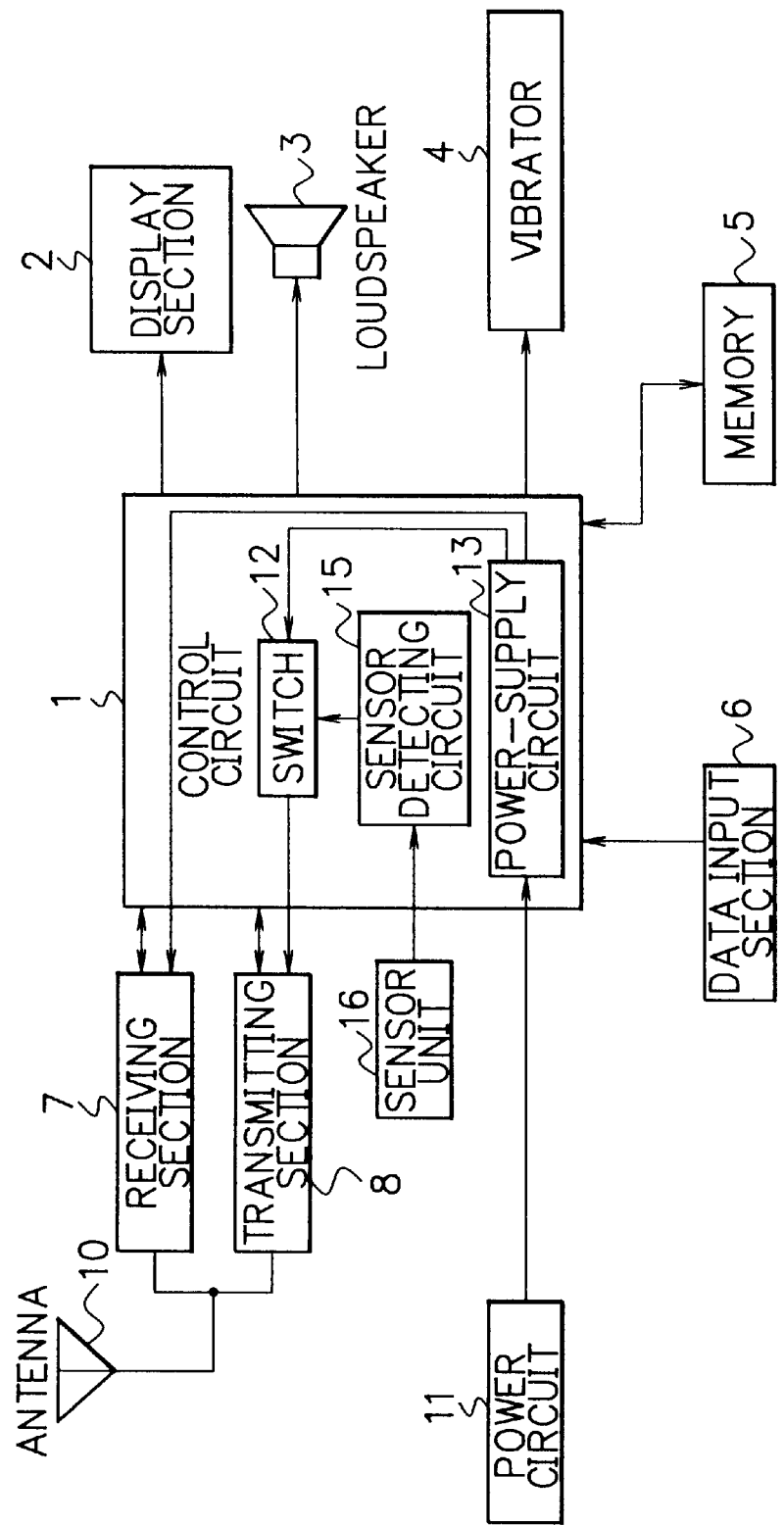
F I G. 6

F I G. 9
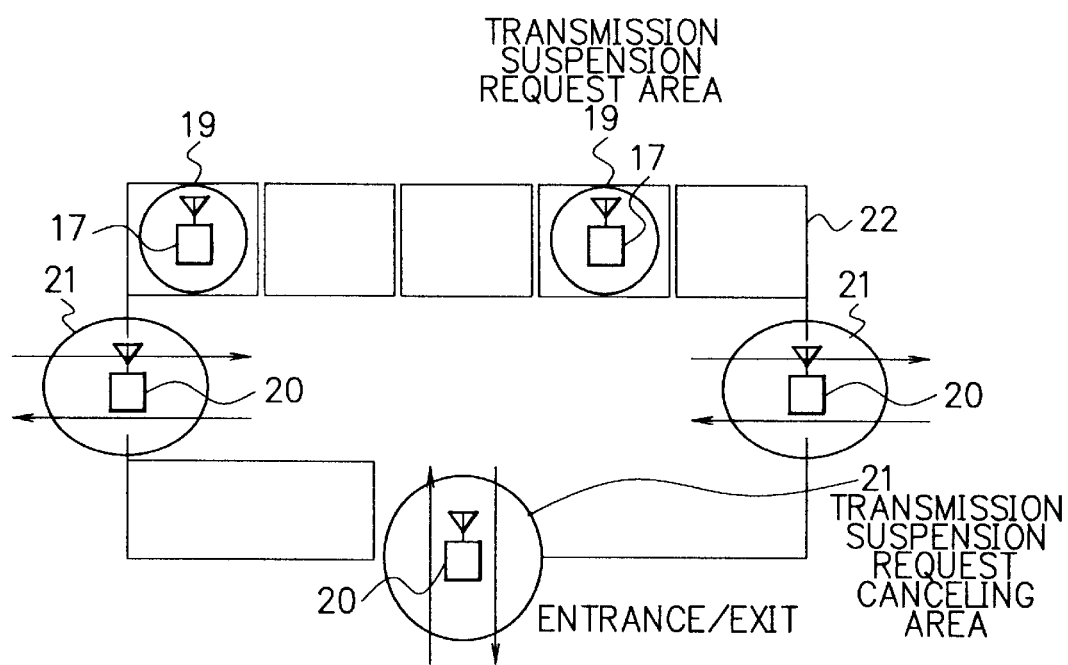

PORTABLE COMMUNICATION SYSTEM AND STORAGE MEDIUM STORING PROGRAM THEREFOR CAPABLE OF SEPARATELY CONTROLLING TRANSMISSION FUNCTION

BACKGROUND OF THE INVENTION

The present invention relates to a portable communication system such as a portable telephone system using radio communications, and to a storage medium storing a program applied to the portable communication system.

The invention is also directed to a portable communication system and a storage medium storing a program applied to the portable communication system, which are capable of controlling a transmission function separately from other functions.

DESCRIPTION OF THE RELATED ART

A conventional portable telephone system, in general, has an information processing function for the user to be able to play games, to refer to a telephone directory, etc., besides signal transmission and reception functions for communications. The conventional portable telephone system usually has an incoming call denying unit, a sound recorder, a vibrator, etc. in order to prevent any sound of incoming call from going off at places where the use of portable communication systems should be restrained.

In the conventional portable telephone system, transmissions directed to a base station are occasionally effected in position registration, in receiving incoming calls, etc., even during a standby mode when the user is not communicating. This kind of transmissions directed to the base station is conducted at all times as long as the portable communication system has its power turned on.

In the conventional portable telephone system, the transmission, reception and information processing functions are all valid while the power is on. However, operation of a single function cannot be individually controlled or terminated separately from the other functions.

As discussed above, in conventional cases, a portable telephone effects transmissions directed to the base station even when no telephone communication takes place. Such transmissions from the portable telephone, for example, can cause malfunctions in medical electronics equipment such as artificial pacemakers, electronic apparatus such as aircraft, etc. In this respect, it is imaginable that this kind of negative influence can be prevented if the transmission function alone can be stopped. However, such an arrangement has not been possible in the conventional system because a single function cannot be separated from the other functions to be controlled individually.

The same problem as discussed above can also be caused when the information processing function is in use, because transmissions to the base station are effected while the information processing function is used. Therefore, it has not been possible for the user to use the information processing function alone while holding transmissions from the portable telephone.

SUMMARY OF THE INVENTION

It is therefore an object of the present invention to provide a portable communication system and a storage medium storing a program applied to the portable communication system, which are capable of controlling operation of a transmission function separately from other functions.

In accordance with the first aspect of the present invention, there is provided a portable communication system with a transmitting section for transmitting signals and a function section having functions other than a transmitting function, comprising a controlling means for suspending transmissions from the transmitting section.

In accordance with the second aspect of the present invention, the portable communication system has a setting means for setting a certain transmission-suspended period when transmissions are to be suspended by the controlling means.

In accordance with the third aspect of the present invention, the portable communication system has a display means for indicating a progress in the transmission-suspended period that is being set by the setting means.

In accordance with the fourth aspect of the present invention, the portable communication system has a first request means for requesting the user to determine whether the transmission suspension should be continued or not after a lapse of the transmission-suspended period.

In accordance with the fifth aspect of the present invention, the portable communication system has a second request means responsive to the case where the user determines that the transmission suspension should be continued after a lapse of the transmission-suspended period, as it requests the user to determine whether said transmission-suspended period previously being set by said setting means should be changed or not.

In accordance with the sixth aspect of the present invention, the portable communication system has a power-supply means for supplying power to the transmitting section and the function section, while the controlling means cuts off the power supplied to said transmitting section from said power-supply means.

In accordance with the seventh aspect of the present invention, in the portable communication system, the function section includes a receiving section for receiving signals, and/or an information processing section for performing information process except for signal transmission/reception.

In accordance with the eighth aspect of the present invention, in the portable communication system, the controlling means controls transmissions on the basis of the operation from the outside such that the transmissions are suspended.

In accordance with the ninth aspect of the present invention, in the portable communication system, the controlling means controls transmissions on the basis of control signals received from the outside such that the transmissions are suspended.

In accordance with the tenth aspect of the present invention, there is provided a storage medium with a program stored therein, provided in a portable communication system with a transmitting section for transmitting signals and a function section having functions other than a transmitting function, the program performing a process of suspending transmissions by said transmitting section.

In accordance with the eleventh aspect of the present invention, the program in the storage medium performs a process of setting a transmission-suspended period when transmissions are to be suspended.

In accordance with the twelfth aspect of the present invention, the program of the storage medium performs a process of displaying progress of the transmission-suspended period.

In accordance with the thirteen aspect of the present invention, the program of the storage medium performs a process of requesting the user to determine whether the transmission suspension should be continued even after a lapse of the transmission-suspended period.

In accordance with the fourteenth aspect of the present invention, the program of the storage medium performs a process of requesting the user to determine whether the transmission-suspended period previously set should be changed or not, in case when the user determines that the transmission suspension should be continued after a lapse of the transmission-suspended period.

In accordance with the fifteenth aspect of the present invention, the program of the storage medium performs a process of supplying power to the transmitting section and the function section, and cuts off the power supplied to the transmitting section by the process of suspending transmissions.

In accordance with the sixteenth aspect of the present invention, the program of the storage medium performs a process of receiving signals by the function section, and/or an information process except for signal transmission/reception.

In accordance with the seventeenth aspect of the present invention, in the storage medium with a program stored therein, the process of sustaining transmissions is based on the instruction from the outside.

In accordance with the eighteenth aspect of the present invention, in the storage medium with a program stored therein, the process of sustaining transmissions is based on control signals received from the outside.

BRIEF DESCRIPTION OF THE DRAWINGS

The above and further objects and the novel feature of the invention will more fully appear from the following detailed description when the same is read in connection with the accompanying drawings, in which:

FIG. 6 is a block diagram showing structure of a portable telephone illustrating a third embodiment of a portable communication system of the present invention;

FIG. 9 is a structural diagram illustrating an application of the third embodiment of the present invention.

DESCRIPTION OF THE PREFERRED EMBODIMENTS

Figure 1:
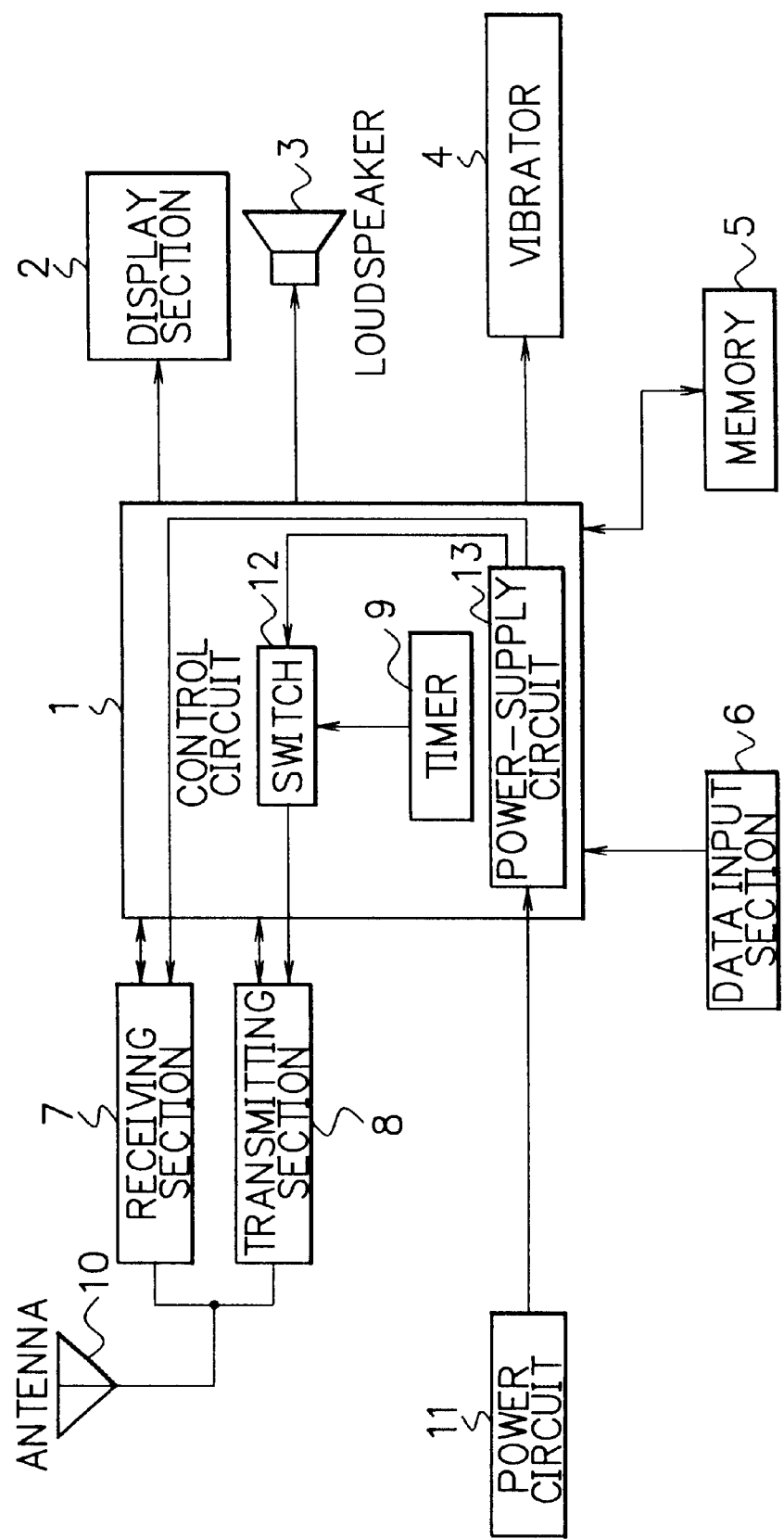
FIG. 1 is a block diagram showing structure of a portable telephone illustrating a first embodiment of a portable communication system of the present invention.

Referring now to the drawings, a description of preferred embodiments of the present invention will be given in detail. FIG. 1 illustrates a first embodiment of a portable telephone system of the present invention. To begin with, structure and operation distinctive of the present invention will be described. In this embodiment, a portable communication system using radio communications is capable of controlling the transmission function, such that transmissions from a portable telephone can be suspended, and the use of the information processing function is made possible while the transmissions are suspended.

In FIG. 1, the portable communication system comprises a control circuit 1, a display section 2, a loudspeaker 3, a vibrator 4, a memory 5, a data input section 6, a receiving section 7, a transmitting section 8, a timer 9, an antenna 10, a power circuit 11, a switch 12, and a power-supply circuit 13.

The control circuit 1 controls the overall processing as to the information processing function, the radio communication function and so forth. The display section 2 displays a transmission-suspended period, a current time, a communication period, character information, image information, etc. The vibrator 4 functions to indicate incoming calls and set off alarms. The memory 5 is for storing a transmission-suspended period, etc. The data input section 6 can be a keyboard, a pen-point input, a touch panel, etc. which functions to input data concerning transmission suspension command, etc. The receiving section 7 receives control signals and audio signals. The transmitting section 8 effects signal transmissions in accordance with a control by the control circuit 1. The timer 9 is to time the transmission-suspended period by a countdown. The power-supply circuit 13 is to distribute the power from the power circuit 11 to each part constituting the portable telephone system. The switch 12 is provided in between the power-supply circuit 13 and the transmitting section 8, and functions to supply or cut off the power to the transmitting section 8.

In operation, the user inputs at least a transmission suspension command, or a transmission-suspended period through the data input section 6. In case when the transmission suspension command alone is inputted, the control circuit 1 is to activate the timer 9 with the transmission-suspended period being set as an unlimited period of time. As a result, the switch 12 is turned off until the transmission suspension command is cancelled, at which time power-supply from the power-supply circuit 13 is cut off.

In case when the user inputs the transmission-suspended period following the transmission-suspended command, or when the user inputs the transmission-suspended period alone, the timer 9 is also activated with a certain time-limit set as the transmission-suspended period. While the timer is counting down the transmission-suspended period, the switch 12 is turned off and the power-supply to the transmitting section 8 is cut off. In this way, transmissions from the portable communication system can be stopped.

Accordingly, the user is capable of suspending transmissions from the portable communication system, while such transmissions can sometimes cause malfunctions in electronic apparatus and equipment such as aircraft, artificial pacemakers, etc. In this event, transmissions to the base station stop, and thus the portable communication system will not respond to but only receives control signals, etc. from the base station.

In the meantime, all parts but the transmitting section 8 is power-supplied, and therefore, the information processing function of the portable communication system, including for instance a telephone directory, a schedule manager, an editor, a browser, an image incorporation, games, etc. can remain effective for use.

While the transmission function is suspended at the transmitting section 8, the display section 2 indicates the state of transmissions being suspended, as well as a remaining time of the transmission-suspended period.

When the timer 9 finishes counting down the transmission-suspended period, the control circuit 1 uses the display section 2 to visually indicate that the time is up by means of characters, images, etc. At the same time, the control circuit 1 uses the loudspeaker 3 to indicate the situation by a sound, or the vibrator 4 to indicate the situation by vibrations. When the user does not request further suspension of transmissions after the user is being informed that the transmission-suspended period is over, the portable communication system returns back to the normal transmitting operation.

Next, an example of operation of the embodiment of the present invention will be described.

When a transmission suspension command is inputted from the data input section 6, the control circuit 1 requests the user to determine and input the transmission-suspended period. Such data-input request to the user is made through the display section 2. The memory 5 receives the inputted transmission suspension command, the transmission-suspended period, etc. from the control circuit 1 so as to have the information stored therein.

The control circuit 1 activates the timer 9 when the transmission-suspended period is inputted due to which a certain limit is set to the transmission-suspended period. The control circuit 1 also activates the timer 9 when the transmission-suspended command alone is inputted, while setting the transmission-suspended period as an unlimited period of time. In this way, the timer 9 receives data on the transmission-suspended period from the memory 5, starts counting down the transmission-suspended period, and outputs a power cut-off signal so as to turn off the switch 12 and cut off the power to the transmitting section 8.

The control section 1 receives data on the remaining time of the transmission-suspended period from the timer 9, so as to display the data on the display section 2. In this event, the display section 2 also indicates that the transmission function is at recess.

When the timer 9 finishes counting down the transmission-suspended period, the control circuit 1 lets such situation be displayed on the display section 2. At the same time, the situation is indicated by a sound or vibrations through a loudspeaker 3 or a vibrator 4. In this event, the control circuit 1 uses the display section 2, and so forth to request the user to decide whether the transmission suspension should continue or not. When the user decides not to go on with the transmission suspension, the power cut-off signal is cancelled to turn on the switch 12 so that the transmission section 8 will be power-supplied.

When it is the case that the transmission suspension command alone is inputted, the timer 9 is activated with the transmission-suspended period being set as an unlimited period of time, which data to be stored in the memory 5. In this case therefore, there is no indication of the transmission-suspended period being over, nor any request to the user on deciding whether the transmission suspension should be continued or not. The transmission suspension will be terminated when the transmission suspension command is cancelled.

Figure 2:
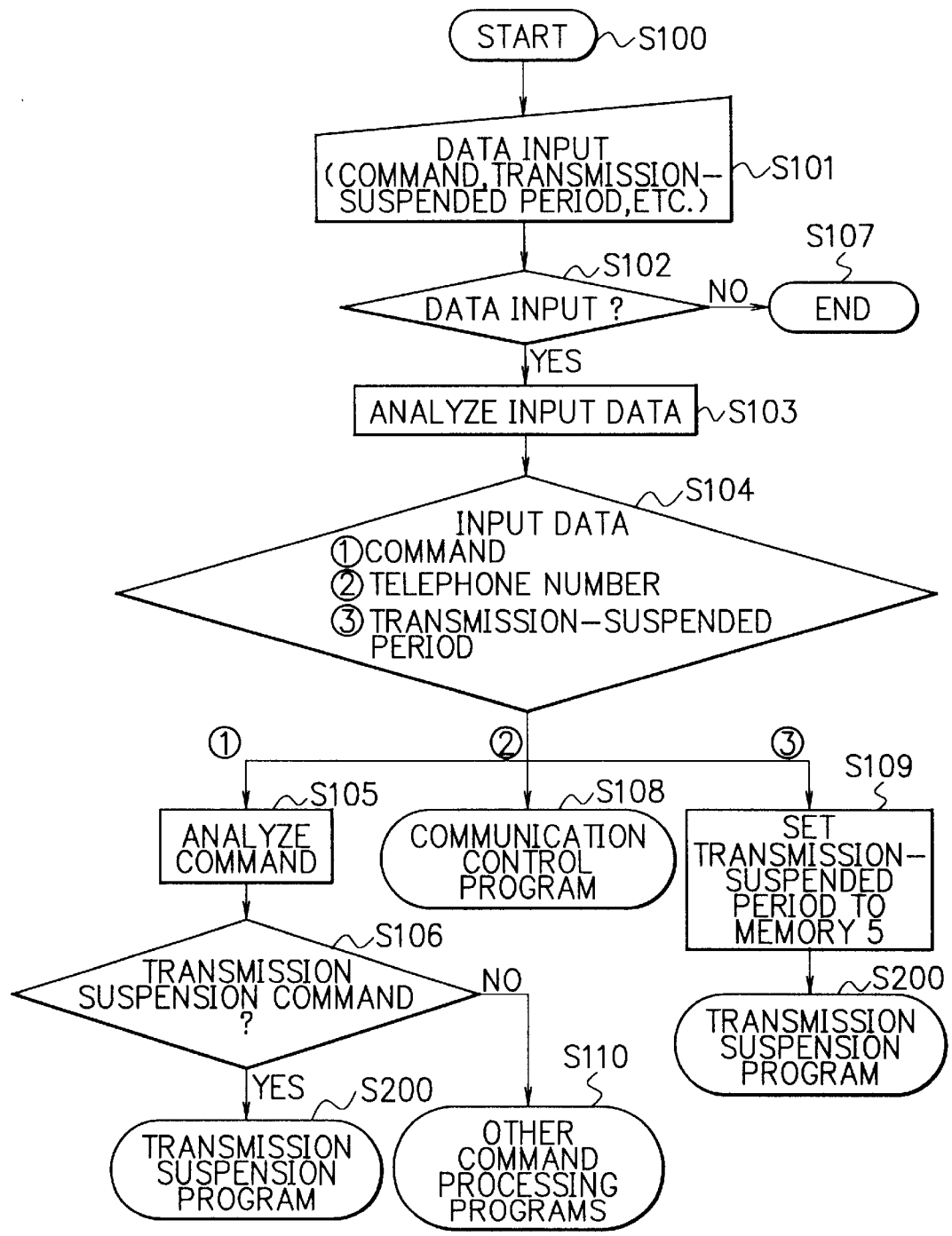
FIG. 2 is a first flow chart showing operation by the first embodiment of the present invention.
Figure 3:
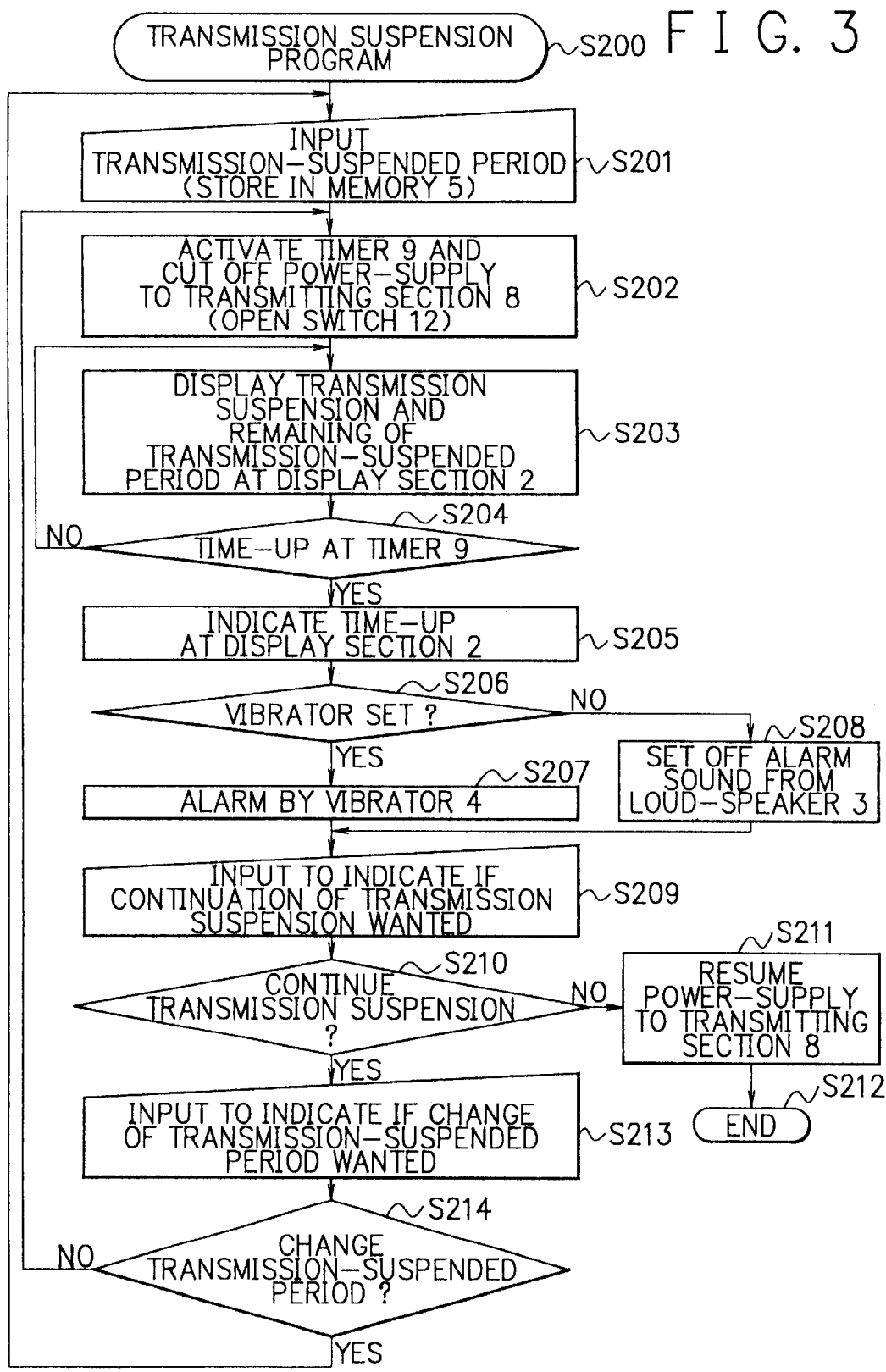
FIG. 3 is a second flow chart showing the operation by the first embodiment of the present invention.

FIG. 2 and FIG. 3 are flow charts showing sequence of processes in the transmission suspension operation. In the following explanation, a command inputted by the user will be a transmission suspension command. Furthermore, a program that the control circuit 1 implements in response to the input of the transmission suspension command is considered as a transmission suspension program.

In FIG. 2, as the portable communication system is doing normal position registration, communication, etc. (step S100), the user inputs data such as transmission suspension command, transmission-suspended period, etc (step S101). The portable communication system then determines that there is a data input (step S102), and analyzes the input data to see what kind of data it is (step S103). When there is no data input at step S102, the operation is terminated (step S107).

At an identifying process over the result of the input data analysis (step S104), when the result indicates that the input data is a transmission suspension command, the input data is analyzed as a command, and the operation proceeds to a branch process ①. On the other hand, when the input data is a transmission-suspended period, the operation will proceed to a branch process ③. At the branch process ①, it will be analyzed what kind of a command the input command is (step S105). At the branch process ③, the transmission-suspended period is stored in the memory 5 (step S109), in response to which the transmission suspension program is initiated (step S200). A branch process ② is a process taken when a certain telephone number is inputted, in response to which a communication control program for effecting a communication control is executed (step S108).

When the input command is determined as a transmission suspension command at step S105 as a result of the command analysis (step S106), a transmission suspension program will be activated (step S200). Furthermore, in case when the input command is a different command, a corresponding processing program for that particular command will be executed (step S110).

At step S200 as the transmission suspension program is activated, the user is requested to input data indicating how long the transmission function should be suspended, i.e. the transmission-suspended period (step S201). However, when the branch process ③ is taken, step S201 will be omitted since the transmission-suspended period is already inputted. In case when no input of the transmission-suspended period in response to the request at step S201 is made, the transmission-suspended period will be set as an unlimited period of time. In the transmission suspension program where the transmission-suspended period is inputted and set, the information will be stored in the memory 5. After the transmission-suspended period is set at the timer 9, the timer 9 is activated to start counting down the transmission-suspended period (step S202).

In this event, the timer 9 keeps outputting the power cut-off signal in the middle of the count-down, so as to turn off the switch 12 and cut off the power-supply to the transmitting section 8. Furthermore, in the transmission suspension program, in case when transmissions are suspended, the display section 2 is to display information indicating that transmissions are at recess, as well as the remaining transmission-suspended period (step S203).

The transmission suspension program then checks to see whether the timer 9 has finished counting down the transmission-suspended period or not (step S204). As the timer 9 finishes counting down the transmission-suspended period, the situation is displayed on the display section 2 (step S205), so as to let the user know that the transmission suspended-period having been set by the user is finished. At the same time, in case when the vibrator 4 of the portable communication system has been set, the vibrator 4 is vibrated (step S207), and in case when the loudspeaker 3 has been set, the loudspeaker 3 sets off an alarm sound, so as to let the user know that the transmission-suspended period is over (step S208).

Then the transmission suspension program is to request the user to determine whether the transmission suspension should be continued or not (step S209). In case when it is determined that the transmission suspension should not be continued after a process on determining whether the transmission suspension should be continued or not (step S210), the timer 9 is stopped. Consequently, the power cut-off signal is cancelled, and the switch 12 is turned on, such that the transmission section 8 is power-supplied (step S211). At the same time, the transmission suspension program will be terminated (step S212).

The above operation is different in case when the user inputs the transmission suspension command alone, because the timer 9 is being set such that the transmission-suspended period is an unlimited period of time, and the transmission suspension will not be terminated unless the transmission suspension command is cancelled.

In case when the user inputs data indicating that the transmission suspension should be continued, the transmission suspension program requests the user to determine whether the transmission-suspended period should be changed or not (step S213). When the user inputs data indicating that the transmission-suspended period is to be changed, the operation returns to step S201 where the transmission-suspended period is to be inputted again. On the other hand, when the user decides not to change the transmission-suspended period, the operation returns back to step S202 after which the transmission suspension is continued.

Figure 4:
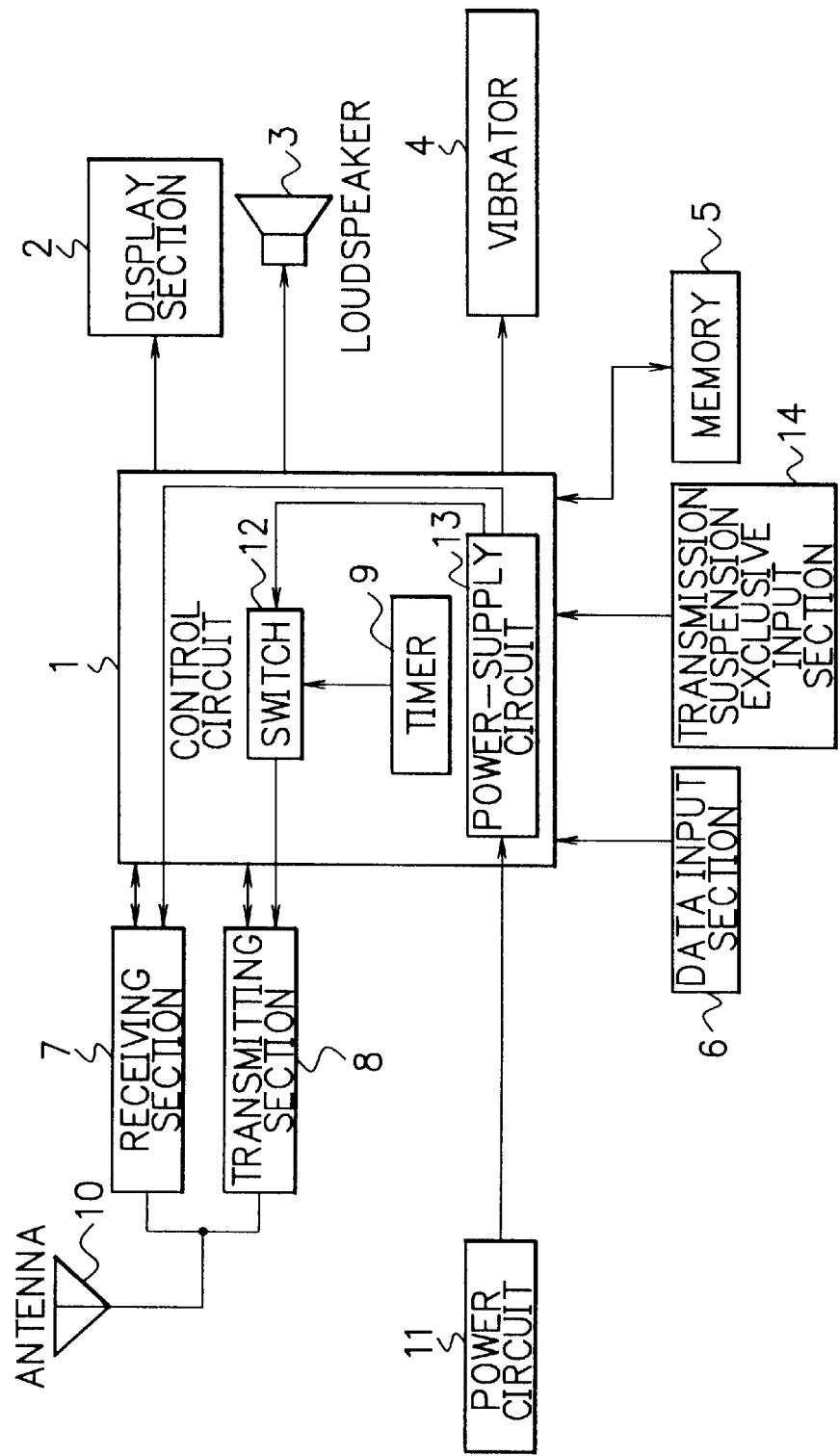
FIG. 4 is a block diagram showing structure of a portable telephone illustrating a second embodiment of the portable communication system of the present invention.

FIG. 4 shows a second embodiment of the present invention. As to parts corresponding to those shown in FIG. 1, the same numerical numbers will be given, and repeated explanation thereof will be omitted. The difference between FIG. 1 and FIG. 4 is that a transmission suspension exclusive input section 14 is provided in the structure shown in FIG. 4. As for the transmission suspension exclusive input section 14, for instance, a slide switch, an input key, etc. can be considered.

Figure 5:
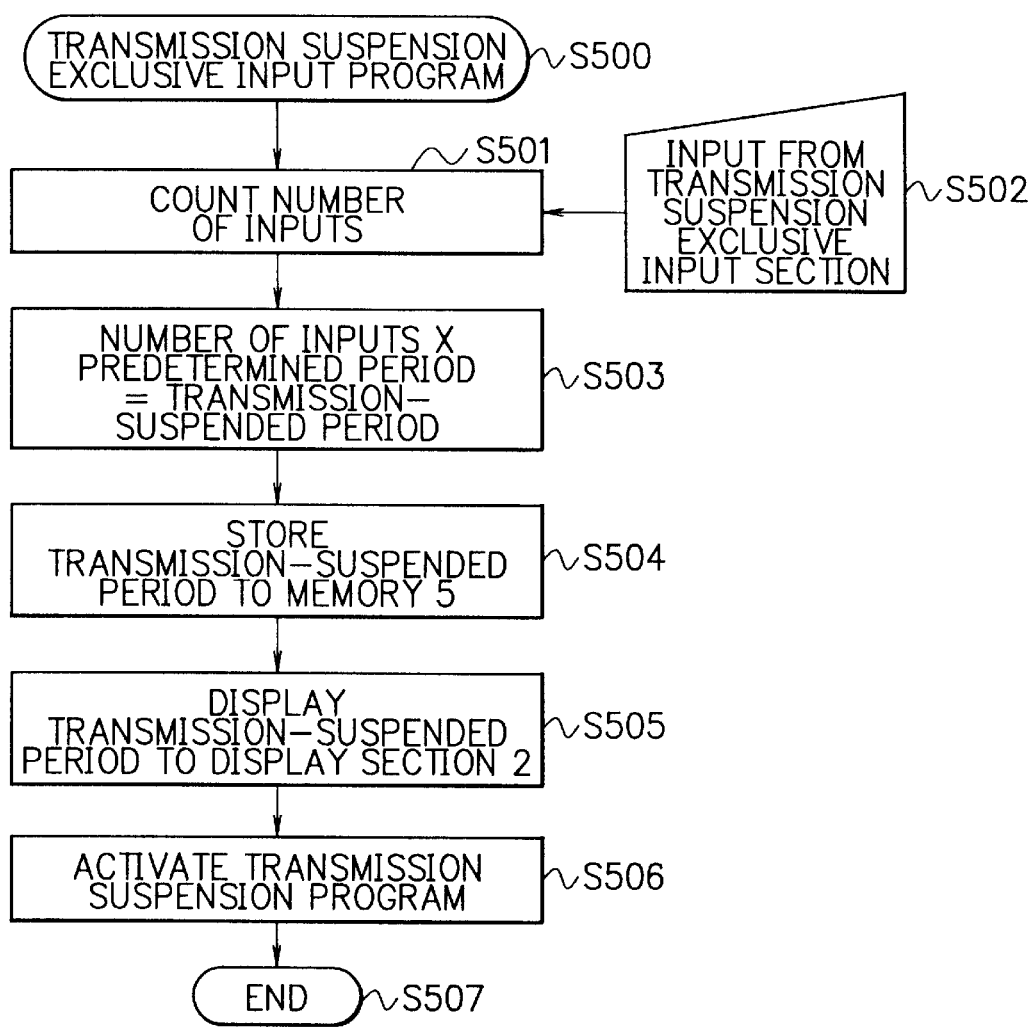
FIG. 5 is a flow chart showing operation by the second embodiment of the present invention.

FIG. 5 is a flow chart showing operation in the second embodiment in case when the portable communication system has the transmission suspension exclusive input section 14. To the transmission suspension exclusive input section 14, the transmission-suspended period is previously being set. For instance, in case when the transmission suspension exclusive input section 14 is an input key, the transmission-suspended period can be set by pressing the input key several times. As the user inputs the transmission-suspended period through the transmission suspension exclusive input section 14, the transmission suspension exclusive input program is activated (step S500). When the user further attempts to input the transmission-suspended period by the transmission suspension exclusive input section 14 (step S502), the transmission suspension exclusive input program is to count the number of times the transmission-suspended period is being inputted (step S501). Then the predetermined period of time is multiplied by the counted number of inputs, to obtain the transmission-suspended period (step S503) which is to be stored in the memory 5 (step S504).

Then after the transmission suspension exclusive input program displays the transmission-suspended period to the display section 2 (step S505), the transmission suspension program is activated (step S506), after which the whole operation is terminated (step S507). The transmission suspension program operates using the transmission-suspended period stored in the memory 5 by the transmission suspension exclusive input program. In this way, the transmission suspension can be set without having to input the transmission suspension command and the transmission-suspended period from the data input section 6.

FIG. 6 is a diagram showing a third embodiment of the present invention. In the third embodiment, the timer 9 in the previous embodiment is replaced with a sensor detecting circuit 15 and a sensor unit 16. The rest of the structure is the same as in FIG. 1. The sensor detecting circuit 15 is to be used with the sensor unit 16 connected thereto, and it serves to control the transmission suspension on the basis of a detection result of the sensor unit 16. One example of the sensor unit 16 would be a receiver (specific low-power etc.).

Figure 7:
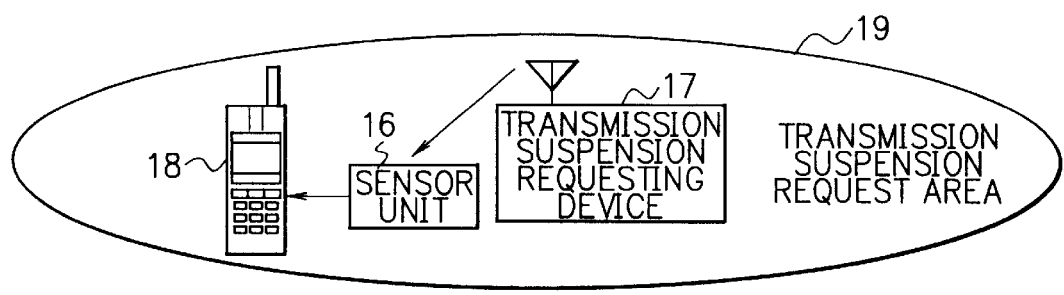
FIG. 7 is a diagram showing an application example of a sensor unit.

FIG. 7 is a diagram showing one example of application of the sensor unit 16. A transmission suspension requesting device 17 transmits a transmission suspension request signal to the sensor unit 16. The sensor unit 16 is a device for receiving this transmission suspension request signal. The portable telephone 18 has a structure as illustrated in FIG. 6. Furthermore, a transmission suspension request area 19 is an area where the transmission suspension request signal from the transmission suspension requesting device 17 has an effect on.

When the portable telephone 18 enters the transmission suspension request area 19, the sensor unit 16 receives the transmission suspension request signal, and passes the signal on to the sensor detecting circuit 15. Then the sensor detecting circuit 15 transmits a power cut-off signal to the switch 12, and at the same time it informs the control circuit 1 that the transmission function is rendered invalid. The control circuit 1 then lets the display section 2 indicate that transmissions have been suspended. As a consequence, the switch 12 is turned off, and transmissions in the transmitting section 8 are suspended.

Figure 8:
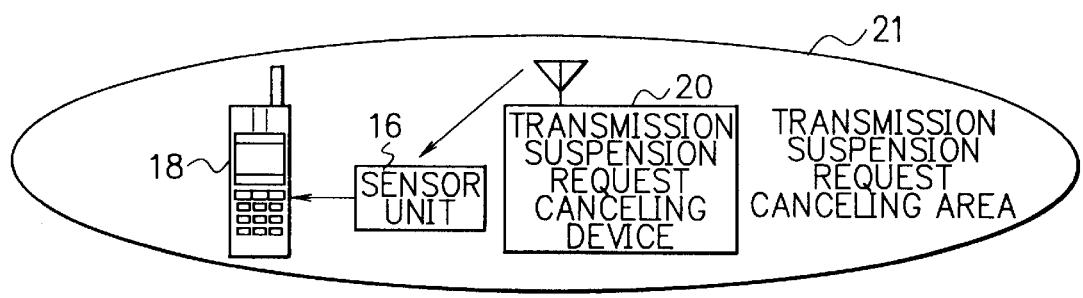
FIG. 8 is a diagram explaining a cancellation of transmission suspension.

FIG. 8 is a diagram showing how the suspension on transmissions is cancelled.

A transmission suspension request canceling device 20 is a device for transmitting a transmission suspension request canceling signal to the sensor unit 16. The transmission suspension request canceling signal functions to let the sensor detecting circuit 15 cancel the power cut-off signal directed to the switch 12. The transmission suspension request canceling area 21 is an area where the transmission suspension request canceling signal is effective.

After the sensor unit 16 receives the transmission suspension request signal, the sensor detecting circuit 15 is to keep outputting the power cut-off signal to the switch 12 until the sensor unit 16 receives the transmission suspension request canceling signal. That is, when the sensor unit 16 receives the transmission suspension request signal, transmissions from the portable telephone 18 will be suspended until the sensor unit 16 receives the transmission suspension request canceling signal.

FIG. 9 is a diagram showing an application of the embodiment of the present invention.

The transmission suspension requesting device 17 is placed in an area in which the portable telephone 18 should stop transmissions therefrom, where the transmission suspension request area 19 is formed. On the other hand, the transmission suspension request canceling device 20 is set at an exit/entrance 22 which is an area including both an area where the portable telephone is allowed to transmit and an area where the portable telephone should suspend any transmission therefrom, so as to form the transmission suspension request canceling area 21. In this manner, the user does not have to go through any special operation, but the suspension of transmissions from the portable telephone 18 can be automatically controlled.

In other words, due to having the sensor detecting circuit 15, the sensor unit 16, the transmission suspension requesting device 17, and the transmission suspension request canceling device 20, transmissions from the portable telephone 18 can be automatically controlled from the outside, even in case when the user forgets to stop the transmissions. Moreover, by changing the form of the sensor unit 16, the transmission suspension request signal can take various forms of medium such as a radio wave, etc.

In realizing the structures as shown in FIG. 1, FIG. 4 and FIG. 6 by applying a computer system using a CPU or a memory, the above described memory would be a storage medium according to the present invention. As to this storage medium, a semiconductor memory, an optical disc, a magneto-optical disc, a magnetic recording medium, etc. can be used.

As it has been discussed above, with respect to the portable communication system and the storage medium storing a program for the portable communication system according to the present invention, the transmission function of the portable communication system can be temporarily terminated. In addition to that, while transmissions are suspended, other functions including for instance a receiving function, an information processing function, etc. can be used in a separate manner. Therefore, at places such as hospitals, aircraft and so forth, where portable communication systems should preferably be refrained from being used, functions other than the transmission function can be effectively used while transmissions from the portable communication system are suspended.

As to the portable communication system and the storage medium storing the program of the portable communication system of the present invention, a period for suspending transmissions can be set on the basis of the user's request.

Furthermore, in accordance with the portable communication system and the storage medium storing the program of the portable communication system of the present invention, the transmission suspension can be effected in response to the user's free will or it can be automatically effected from the outside.

While preferred embodiments of the invention have been described using specific terms, such description is for illustrative purposes only, and it is to be understood that changes and variations may be made without departing from the spirit or the scope of the following claims.

What is claimed is:

1. A portable communication system having a transmitting section for transmitting signals and a function section having functions other than a transmitting function, the system further comprising:
a controlling means, memory means, timing means and a interface means located within a portable communication device for selectively suspending transmissions from said transmitting section independently from said other functions, wherein said interface means receives a command indicating suspension for a desired period of suspension, said control means stores said desired period of suspension in said memory means and all radio transmissions from said portable communication system are ceased while transmission is suspending for said period of suspension determined by said timing means, wherein said desired period of suspension is inputted into said interface means using a setting means.

2. A portable communication system as claimed in claim 1, wherein said setting means is capable of setting said period of suspension to a predetermined default value which is already stored in said memory means when no period of suspension is inputted into said setting means.

3. A portable communication system as claimed in claim 1 further comprising:
a display means for indicating a progress in said period of suspension that is being set by said setting means.

4. A portable communication system as claimed in claim 1, further comprising:
a first request means for requesting from the said interface means a command to determine whether the transmission suspension should be continued or not after a lapse of said period of suspension.

5. A portable communication system as claimed in claim 1, further comprising:
a second request means responsive to the case where the interface means receives a commend that the transmission suspension should be continued after a lapse of said period of suspension, requesting from said interface means a second command whether said period of suspension previously being set by said setting means should be changed or not.

6. A portable communication system as claimed in claim 1, further comprising:
a power-supply means for supplying power to said transmitting section and said function section, wherein;
said controlling means cuts off the power supplied to said transmitting section from said power-supply means.

7. A portable communication system as claimed in claim 1, wherein said function section includes a receiving section for receiving signals, and/or an information processing section for performing information process except for signal transmission/reception.

8. A portable communication system as claimed in claim 1, wherein said controlling means controls transmissions on the basis of the operation of said interface means from the outside such that the transmissions are selectively and independently suspended.

9. A portable communication system as claimed in claim 1, wherein said controlling means controls transmissions on the basis of control signals received in said interface means from the outside such that the transmissions are suspended.

10. A storage medium with a program stored therein, provided in a portable communication system with a transmitting section for transmitting signals and a function section having functions other than a transmitting function, said program performing a process of selectively suspending transmissions from said transmitting section independently from said other functions, wherein a interface means receives a command indicating a desired suspension for a desired period of suspension, said control means stores said desired period of suspension in a memory means and all radio transmissions from said portable communication system are ceased while transmission is suspending for said period of suspension determined by a timing means wherein said desired period of suspension is inputted into said interface means using a setting means.

11. A storage medium with a program stored therein as claimed in claim 10, wherein said program performs a process of setting said period of suspension to a predetermined default value which is already stored in said memory means when no period of suspension is inputted into said setting means.

12. A storage medium with a program stored therein as claimed in claim 10, wherein said program performs a process of displaying progress of said period of suspension.

13. A storage medium with a program stored therein as claimed in claim 10, wherein said program performs a process of requesting from the said interface means a command to determine whether the transmission suspension should be continued after a lapse of said period of suspension.

14. A storage medium with a program stored therein as claimed in claim 10, wherein said program performs a process of requesting from the said interface means a commend to determine whether the period of suspension previously set should be changed or not, in case when a prior command from said interface means was received determining that the transmission suspension should be continued after a lapse of said period of suspension.

15. A storage medium with a program stored therein as claimed in claim 10, wherein said program performs a process of supplying power to said transmitting section and said function section, and cuts off the power supplied to said transmitting section by said process of suspending transmissions.

16. A storage medium with a program stored therein as claimed in claim 10, wherein said program performs a process of receiving signals by said function section, and/or an information process except for signal transmission/reception.

17. A storage medium with a program stored therein as claimed in claim 10, wherein said process of suspending transmissions is based on the instruction received by said interface means from the outside.

18. A storage medium with a program stored therein as claimed in claim 10, wherein said process of suspending transmissions is based on control signals received by said interface means from the outside.

* * * * *